US011790213B2

(12) United States Patent
Yao et al.

(10) Patent No.: US 11,790,213 B2
(45) Date of Patent: Oct. 17, 2023

(54) IDENTIFYING COMPLEX EVENTS FROM HIERARCHICAL REPRESENTATION OF DATA SET FEATURES

(71) Applicant: SRI International, Menlo Park, CA (US)

(72) Inventors: Yi Yao, Princeton, NJ (US); Ajay Divakaran, Monmouth Junction, NJ (US); Pallabi Ghosh, College Park, MD (US)

(73) Assignee: SRI INTERNATIONAL, Menlo Park, CA (US)

( * ) Notice: Subject to any disclaimer, the term of this patent is extended or adjusted under 35 U.S.C. 154(b) by 1162 days.

(21) Appl. No.: 16/439,508

(22) Filed: Jun. 12, 2019

(65) Prior Publication Data
US 2020/0394499 A1 Dec. 17, 2020

(51) Int. Cl.
*G06N 3/045* (2023.01)
*G06N 3/08* (2023.01)
(52) U.S. Cl.
CPC .............. *G06N 3/045* (2023.01); *G06N 3/08* (2013.01)
(58) Field of Classification Search
CPC ......... G06N 3/0454; G06N 3/08; G06N 5/022
See application file for complete search history.

(56) References Cited

U.S. PATENT DOCUMENTS 7,788,109 B2 * 8/2010 Jakobson ............ H04L 41/0631
705/1.1
11,074,497 B2 * 7/2021 Ascari .................... G06N 7/005

OTHER PUBLICATIONS

Jain, A., Zamir, A. R., Savarese, S., & Saxena, A. (2016). Structural-rnn: Deep learning on spatio-temporal graphs. In Proceedings of the IEEE conference on computer vision and pattern recognition (pp. 5308-5317). (Year: 2016).*
Bhoi, A. (2019). Spatio-temporal action recognition: A survey. arXiv preprint arXiv:1901.09403. (Year: 2019).*
Yu, B., Yin, H., & Zhu, Z. (2019). St-unet: A spatio-temporal u-network for graph-structured time series modeling. arXiv preprint arXiv:1903.05631. (Year: 2019).*

(Continued)

*Primary Examiner* — Kamran Afshar
*Assistant Examiner* — Henry Trong Nguyen
(74) *Attorney, Agent, or Firm* — Shumaker & Sieffert, P.A.

(57) ABSTRACT

Techniques are disclosed for identifying multimodal subevents within an event having spatially-related and temporally-related features. In one example, a system receives a Spatio-Temporal Graph (STG) comprising (1) a plurality of nodes, each node having a feature descriptor that describes a feature present in the event, (2) a plurality of spatial edges, each spatial edge describing a spatial relationship between two of the plurality of nodes, and (3) a plurality of temporal edges, each temporal edge describing a temporal relationship between two of the plurality of nodes. Furthermore, the STG comprises at least one of: (1) variable-length descriptors for the feature descriptors or (2) temporal edges that span multiple time steps for the event. A machine learning system processes the STG to identify the multimodal subevents for the event. In some examples, the machine learning system comprises stacked Spatio-Temporal Graph Convolutional Networks (STGCNs), each comprising a plurality of STGCN layers.

20 Claims, 9 Drawing Sheets

(56) References Cited

OTHER PUBLICATIONS

Piergiovanni et al., "Learning Latent Super-Events to Detect Multiple Activities in Videos," Conference on Computer Vision and Pattern Recognition (CVPR), vol. 4, Mar. 2018, 10 pp.
Carreira et al., "Quo Vadis, Action Recognition? A New Model and the Kinetics Dataset," Cornell University arXiv:1705.07750v3, Feb. 12, 2018, 10 pp.
Simonyan et al., "Very Deep Convolutional Networks for Large-Scale Image Recognition," ICLR, Apr. 2015, 14 pp.
Yan et al., "Spatial Temporal Graph Convolutional Networks for Skeleton-Based Action Recognition," Cornell University, Jan. 25, 2018, 10 pp.
Li et al., "Situation Recognition with Graph Neural Networks," Cornell University arXiv:1708.04320v1, Aug. 14, 2017 22 pp.
Allen Institute for AI, "Charades and Charades-Ego Datasets," retrieved from https://allenai.org/plato/charades/, Nov. 15, 2019, 7 pp.
Yatskar et al. "imSitu (/)," retreived from http://imsitu.org/, Nov. 15, 2019, 2 pp.
Cornell Personal Robotics, "Cornell Activity Datasets: CAD-60 & CAD-120," retrieved from pr.cs.cornell.edu/humanactivities/data.php, Nov. 15, 2019, 4 pp.
"Open NI," retrieved from Wayback Machine dated Apr. 16, 2014, web.archive.org/web/20140416020955/http:/www.openni.org/, accessed on Nov. 27, 2019, 2 pp.
Atwood et al., "Diffusion-Convolutional Neural Networks," 29th Conference on Neural Information Processing Systems, Jul. 8, 2016, 9 pp.
Blier et al., "The Description of Deep Learning Models," 32nd Conference on Neural Information Processing Systems, Nov. 1, 2018, 16 pp.
Bruna et al., "Community Detection with Graph Neural Networks," Cornell University arXiv:1705.08415v2, May 27, 2017, 15 pp.
Dave et al., "Predictive-Corrective Networks for Action Detection," In Proceedings of the Computer Vision and Pattern Recognition, Dec. 12, 2017, 10 pp.
Defferrard et al., "Convolutional Neural Networks on Graphs with Fast Localized Spectral Filtering," 30th Conference on Neural Information Processing Systems, Jun. 2016, 9 pp.
Diba et al., "Temporal 3D ConvNets: New Architecture and Transfer Learning for Video Classification," Cornell University arXiv:1711.08200v1, Nov. 22, 2017, 9 pp.
Ding et al., "TricorNet: A Hybrid Temporal Convolutional and Recurrent Network for Video Action Segmentation," Cornell University arXiv:1705.07818v1, May 22, 2017, 10 pp.
Ding et al., "Weakly-Supervised Action Segmentation with Iterative Soft Boundary Assignment," In Proceedings of the Computer Vision and Pattern Recognition, Mar. 28, 2018, 9 pp.
Duvenaud et al., "Convolutional Networks on Graphs for Learning Molecular Fingerprints," 28th International Conference on Neural Information Processing Systems, Nov. 3, 2015, 9 pp.
Guo et al., "Neural graph matching networks for fewshot 3D action recognition," In European Conference on Computer Vision, Springer, Sep. 2018, 17 pp.
Hammond et al., "Wavelets on Graphs via Spectral Graph Theory," Applied and Computational Harmonic Analysis, 30(2), Mar. 2011, pp. 129-150.
Jain et al., "Structural-RNN: Deep Learning on Spatio-Temporal Graphs," Computer Vision Foundation, Jun. 2016, pp. 5308-5317.
Kay et al., "The Kinetics Human Action Video Dataset," Cornell University arXiv:1705.06950v1, May 19, 2017, 22 pp.
Kipf et al., "Semi-Supervised Classification with Graph Convolutional Networks," Cornell University arXiv: 1609.02907v4 published as a conference paper at ICLR 2017, Feb. 22, 2017, 14 pp.
Koppula et al., "Learning Human Activities and Object Affordances from RGB-D Videos," The International Journal of Robotics Research, 32(8): Jul. 11, 2013, pp. 951-970.
Koppula et al., "Anticipating Human Activities using Object Affordances for Reactive Robotic Response," IEEE Transactions on Pattern Analysis and Machine Intelligence, Jan. 2016, 14 pp.
Lei et al., "Temporal deformable residual networks for action segmentation in videos," Computer Vision Foundation, Apr. 2018, pp. 6742-6751.
Li et al., Factorizable Net: An efficient subgraph-based framework for scene graph generation. In European Conference on Computer Vision, Oct. 2018, 17 pp.
Li et al., "Gated graph sequence neural networks," Cornell University arXiv:1511.05493v1, Nov. 17, 2015, 15 pp.
Mavroudi et al., "End-to-end fine-grained action segmentation and recognition using conditional random field models and discriminative sparse coding," Cornell University arXiv:1801.09571v1, Jan. 29, 2018, 10 pp.
Newell et al., "Stacked hourglass networks for human pose estimation," Cornell University arXiv:1603.06937v2, Jul. 26, 2016, 17 pp.
Pirsiavash et al., "Parsing videos of actions with segmental grammars," Computer Vision Foundation, Jun. 2014, pp. 612-619.
Qiu et al., "Learning spatio-temporal representation with pseudo-3D residual networks," Computer Vision Foundation, Oct. 2017, pp. 5534-5541.
Lea et al., "Temporal convolutional networks for action segmentation and detection," Computer Vision Foundation, Jul. 2017, pp. 156-165.
Scarselli et al., "The graph neural network model," IEEE Transactions on Neural Networks, 20(1): Jan. 2009, pp. 61-80.
Scarselli et al., "Graph neural networks for ranking web pages," In Proceedings of the 2005 IEEE/WIC/ACM International Conference on Web Intelligence, IEEE Computer Society, Sep. 2005, 7 pp.
Schlichtkrull et al., "Modeling relational data with graph convolutional networks," Cornell University arXiv:1703.06103v4, Oct. 26, 2017, 9 pp.
Shahroudy et al., "NTU RGB+ D: A large scale dataset for 3d human activity analysis," Computer Vision Foundation, Jun. 2016, pp. 1010-1019.
Sigurdsson et al., "Asynchronous temporal fields for action recognition," Computer Vision Foundation, Jul. 2017, pp. 585-594.
Sigurdsson et al., "Hollywood in homes: Crowdsourcing data collection for activity understanding," Cornell University arXiv:1604.014753v3, Jul. 26, 2016, 17 pp.
Simonyan et al., "Two-stream convolutional networks for action recognition in videos," in Advances in Neural information processing systems, Dec. 2014, 9 pp.
Singh et al., A multi-stream bi-directional recurrent neural network for fine-grained action detection. Computer Vision Foundation, Jun. 2016, pp. 1961-1970.
Te et al., "RGCNN: Regularized graph CNN for point cloud segmentation," Cornell University arXiv:1806.02952v1, Jun. 8, 2018, 10 pp.
Tran et al., "A closer look at spatiotemporal convolutions for action recognition," Computer Vision Foundation, Jun. 2018, pp. 6450-6459.
Wang et al., "Temporal segment networks: Towards good practices for deep action recognition," Cornell University arXiv:1608.00859v1, Aug. 2, 2016. 16 pp.
Wang et al., "Videos as space-time region graphs," Cornell University arXiv:1806.01810v2, Dec. 21, 2018, 21 pp.
Xiang et al., "S3D: Stacking segmental P3D for action quality assessment," In 25th IEEE International Conference on Image Processing, Oct. 2018, pp. 928-932.
Xu et al., "R-C3D: Region convolutional 3D network for temporal activity detection," Computer Vision Foundation, Oct. 2017, pp. 5783-5792.
Yan et al., "Spatial temporal graph convolutional networks for skeleton-based action recognition," Thirty-Second AAAI Conference on Artificial Intelligence, Apr. 2018, pp. 7444-7452.
Yang et al., "Stacked hourglass network for robust facial landmark localisation," Computer Vision Foundation, Jul. 2017, pp. 79-87.
Yatskar et al., "Situation recognition: Visual semantic role labeling for image understanding," Computer Vision Foundation, Jun. 2016, pp. 5534-5542.
Yeung et al., "Every moment counts: Dense detailed labeling of actions in complex videos," International Journal of Computer Vision, 126(2-4): Apr. 2018, 10 pp.

(56) References Cited

OTHER PUBLICATIONS

Zhang et al., "Deep spatio-temporal residual networks for citywide crowd flows prediction," In AAAI, Jan. 2017, 7 pp.
Zhang et al., "Graph edge convolutional neural networks for skeleton based action recognition," Cornell University, arXiv:1805.06184, May 31, 2018, 23 pp.
Sigurdsson et al., "Actor and observer: Joint modeling of first and third-person videos," Computer Vision Foundation, Jun. 2018, pp. 7396-7404.

* cited by examiner

IDENTIFYING COMPLEX EVENTS FROM HIERARCHICAL REPRESENTATION OF DATA SET FEATURES

GOVERNMENT RIGHTS

This invention was made with government support under contract D17PC00343 awarded by the Department of the Interior/Interior Business Center. The government has certain rights in the invention.

TECHNICAL FIELD

This disclosure generally relates to machine learning systems.

BACKGROUND

Convolutional neural networks (CNNs) are a class of deep neural networks that may be useful for analyzing visual imagery. A CNN is formed by a stack of distinct layers or filters. Each filter applies a differentiable function, e.g., a convolution, to transform an input to an output. Graph neural networks (GNNs), such as graph convolutional networks (GCNs) demonstrate improvements over CNNs on a grid-like or sequential data for various machine learning or computer vision tasks. A GNN receives a graph as an input and learns a function of features on the graph. GNNs have been used in a number of different applications like situation recognition, human-object interaction, webpage ranking, mutagenesis, etc. GNNs may provide advantages over CNNs in tasks such as node classification, community clustering, link prediction, 3D point cloud segmentation, etc.

Graph-based representation has become a popular option for action recognition, such as skeleton-based activity recognition using spatio-temporal graph convolutional networks (STGCNs). A conventional STGCN is a type of GCN that performs, e.g., skeleton-based activity recognition. For example, a conventional STGCN forms a spatio-temporal graph (STG) from spatial connections between joints of the human body and connections between the joints across time. An STGCN exploits actor poses described by the STG to achieve performance improvements over other types of GCNs in performing skeleton-based activity recognition.

Action segmentation presents a more challenging problem than activity recognition in the sense that action segmentation is the process of identifying a sequence of actions with semantic labels and temporally localized starting and ending points of each identified actions. For example, activity recognition may involve identifying, from video data, a movement of an arm of a human being, while action segmentation may involve identifying that the movements of the arm indicate that the human is pouring water into a glass. Due to the oversimplified structure of a conventional STGCN, such a conventional STGCN is insufficient to handle the varied and complex information required to perform action segmentation with contextual cues and large graph deformation.

SUMMARY

In general, the disclosure describes techniques for identifying multimodal subevents within an event having spatially-related and temporally-related features. Such multimodal subevents may be, e.g., a recognized human or animal activity from video data, predictions of financial movements from financial data, or forecasts of weather events from meteorological data. In one example, a machine learning system processes an STG that represents a plurality of features present in an event and spatial and temporal relationships between the features to identify, from the STG, one or more multimodal subevents present within the event.

The techniques described herein including modifying a conventional STG to implement a new form of STG that describes contextual information beyond the information contained in relationships over time alone (e.g., skeletal joint connections over time). For example, an STG as described herein may include descriptors of features, functional relationships between the features, and temporal relationships between the features. Furthermore, the STG described herein may include variable-length feature descriptors. The STG described herein may further include temporal edges that span multiple time steps for the event or that have any number of connections.

The techniques of the disclosure may additionally provide for improvements to a machine learning system to enable processing of the modified STG. For example, a machine learning system as described herein implements a plurality of stacked hourglass STGCNs (also referred to herein as "stacked STGCNs") that process the STG, each STGCN comprising a plurality of STGCN layers. As described herein, such a machine learning system implementing a plurality of stacked STGCNs is capable of receiving, as an input, an STG that has feature descriptors of variable-length and converting the feature descriptors to a fixed length. Further, the machine learning system described herein may receive an STG that has temporal edges that span multiple time steps for the event.

The techniques of the disclosure provide specific improvements to the computer-related field of machine learning that have practical applications. For example the techniques of the disclosure may allow a machine learning system to use a rich set of contextual cues to perform, e.g., joint inferencing. Further, the techniques of the disclosure may enable a machine learning system to implement a flexible graph configuration that supports a wide range of descriptors with varied feature lengths. A machine learning system as described herein may be robust against large amounts of graph deformation over long data sequences (e.g., such as video sequences). Therefore, the techniques described herein may improve the accuracy of action recognition, localization, and segmentation over conventional techniques. The techniques may further improve the robustness and generalization performance of machine learning systems for action segmentation over long video sequences.

In one example, this disclosure describes a system for identifying one or more multimodal subevents within an event having spatially-related and temporally-related features, the system comprising: an input unit configured to receive a Spatio-Temporal Graph (STG) comprising (1) a plurality of nodes, each node of the plurality of nodes having a feature descriptor that describes a feature present in the event, (2) a plurality of spatial edges, each spatial edge of the plurality of spatial edges describing a spatial relationship between two of the plurality of nodes, and (3) a plurality of temporal edges, each temporal edge of the plurality of temporal edges describing a temporal relationship between two of the plurality of nodes, wherein the STG comprises at least one of: (1) variable-length descriptors for the feature descriptors; or (2) temporal edges that span multiple time steps for the event; a computation engine comprising processing circuitry for executing a machine learning system comprising one or more stacked Spatio-Temporal Graph Convolutional Networks (STGCNs) each comprising a plurality of STGCN layers, the one or more stacked STGCNs configured to process the STG to identify the one or more multimodal subevents for the event; and an output device configured to output an indication of the one or more multimodal subevents.

In another example, this disclosure describes a method for identifying one or more multimodal subevents within an event having spatially-related and temporally-related features, the method comprising: receiving, by a computing system comprising a machine learning system, a Spatio-Temporal Graph (STG) comprising (1) a plurality of nodes, each node of the plurality of nodes having a feature descriptor that describes a feature present in the event, (2) a plurality of spatial edges, each spatial edge of the plurality of spatial edges describing a spatial relationship between two of the plurality of nodes, and (3) a plurality of temporal edges, each temporal edge of the plurality of temporal edges describing a temporal relationship between two of the plurality of nodes, wherein the STG comprises at least one of: (1) variable-length descriptors for the feature descriptors; or (2) temporal edges that span multiple time steps for the event; executing, by the computing system, the machine learning system to process the STG to identify the one or more multimodal subevents for the event, wherein the machine learning system comprises one or more stacked Spatio-Temporal Graph Convolutional Networks (STGCNs) each comprising a plurality of STGCN layers; and outputting, by an output device, an indication of the one or more multimodal subevents.

In another example, this disclosure describes a non-transitory computer-readable medium comprising instructions for identifying one or more multimodal subevents within an event having spatially-related and temporally-related features, the instructions configured to cause processing circuitry of a computation engine to: receive a Spatio-Temporal Graph (STG) comprising (1) a plurality of nodes, each node of the plurality of nodes having a feature descriptor that describes a feature present in the event, (2) a plurality of spatial edges, each spatial edge of the plurality of spatial edges describing a spatial relationship between two of the plurality of nodes, and (3) a plurality of temporal edges, each temporal edge of the plurality of temporal edges describing a temporal relationship between two of the plurality of nodes, wherein the STG comprises at least one of: (1) variable-length descriptors for the feature descriptors; or (2) temporal edges that span multiple time steps for the event; execute a machine learning system to process the STG to identify the one or more multimodal subevents for the event, wherein the machine learning system comprises one or more stacked Spatio-Temporal Graph Convolutional Networks (STGCNs) each comprising a plurality of STGCN layers; and output an indication of the one or more multimodal subevents.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
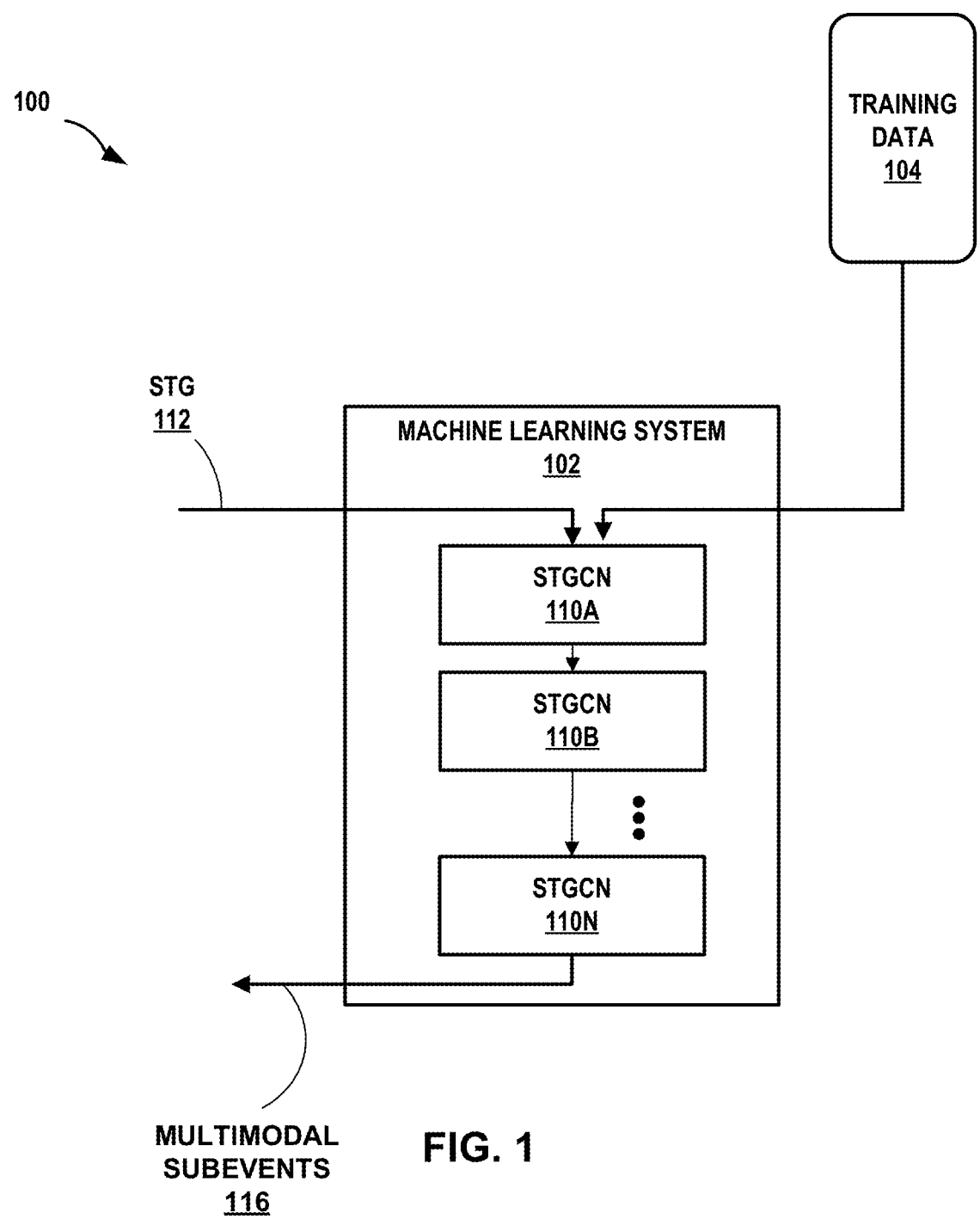
FIG. 1 is a block diagram illustrating an example machine learning system for identifying multimodal subevents within an event having spatially-related and temporally-related features in accordance with the techniques of the disclosure.

A GCN is applied to space-time graphs extracted from the whole video segment to output an accumulative descriptor, which is later combined with the aggregated frame-level features to generate action prediction. An STGCN is a type of GCN that performs, e.g., skeleton-based activity recognition. A conventional STGCN forms an STG from spatial connections between joints of the human body and connections between the joints across time. For example, a conventional STGCN includes nodes that describe skeletal joints. Spatial connections between the nodes of a conventional STGCN depend on physical adjacency of these joints in the human body, and temporal edges between the nodes of the conventional STGCN connect joints of the same type (e.g., right wrist to right wrist) across one consecutive time step. An STGCN may exploit actor poses described by the STG to achieve performance improvements over other types of GCNs in performing skeleton-based activity recognition on datasets such as the Kinetics-skeleton dataset, available from DeepMind Technologies Limited, and the NTU RGB+D dataset available from the ROSE Lab at the Nanyang Technological University, Singapore. However, a conventional STGCN is an oversimplified structure that is insufficient to handle the varied and complex information required to perform action segmentation with contextual cues and large graph deformation.

The techniques of the disclosure include, in some aspects, stacked STGCNs for identifying multimodal subevents within an event having spatially-related and temporally-related features. In one example, to identify the multimodal subevents within the event, the stacked STGCNs perform action segmentation, e.g., predicting and localizing a sequence of actions over long videos of humans. The techniques of the disclosure extend a convention STGCN proposed for skeleton-based action recognition to enable the disclosed STGCN to receive an STG that includes nodes with different characteristics (e.g., scene, actor, object, action, etc.), feature descriptors with varied lengths, or arbitrary temporal edge connections. Such modifications may allow the STGCN described herein to account for large graph deformation commonly associated with complex activities.

Furthermore, the techniques of the disclosure include, in some aspects, a stacked hourglass architecture to the STGCN that allows leveraging of the advantages of an encoder-decoder design to improve the generalization performance and localization accuracy of STGCNs. In some examples, a stacked STGCN as described herein may use various descriptors, such as frame-level Oxford Visual Geometry Group (VGG)-type neural network, segment-level Inflated 3-Dimensional Convolutional (I3D) neural network, region-proposal convolutional neural network (RCNN)-based objects, etc., as node descriptors of an STG to enable action segmentation based on joint inference over comprehensive contextual information.

A stacked STGCN as described herein may achieve, e.g., a 4.0% performance improvement over the best reported results in F1 score on the CAD120 dataset (which provides pre-computed node features and edge weights for fair performance comparison across algorithms), available from Cornell University at http://pr.cs.cornell.edu/humanactivities/data.php. Further, a stacked STGCN as described herein may achieve, e.g., a 1.3% performance improvement in mean average precision (mAP) on the Charades dataset using VGG features, available from the Allen Institute for Artificial Intelligence at https://allenai.org/plato/charades/, which provides a more complex real-world activity dataset.

FIG. 1 is a block diagram illustrating example machine learning system 102 for identifying multimodal subevents within an event having spatially-related and temporally-related features in accordance with the techniques of the disclosure. In one example, machine learning system 102 identifies one or more multimodal subevents 116 from STG 112. As shown, machine learning system 102 includes an architecture comprising a plurality of stacked STGCNs 110A-110N (hereinafter, STGCNs 110).

In some examples, machine learning system 102 may comprise a computation engine implemented in circuitry. For instance, a computation engine of system 102 may include, any one or more of a microprocessor, a controller, a digital signal processor (DSP), an application specific integrated circuit (ASIC), a field-programmable gate array (FPGA), or equivalent discrete or integrated logic circuitry. In another example, system 102 may comprise any suitable computing system, such as desktop computers, laptop computers, gaming consoles, personal digital assistants (PDAs), smart televisions, handheld devices, tablets, mobile telephones, "smart" phones, etc. In some examples, at least a portion of system 102 may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

In some examples, system 102 may be implemented in circuitry, such as via one or more processors and/or one or more storage devices (not depicted). One or more of the devices, modules, storage areas, or other components of system 102 may be interconnected to enable inter-component communications (physically, communicatively, and/or operatively). In some examples, such connectivity may be provided by through system bus, a network connection, an inter-process communication data structure, or any other method for communicating data. The one or more processors of system 102 may implement functionality and/or execute instructions associated with system 102. Examples of processors include microprocessors, application processors, display controllers, auxiliary processors, one or more sensor hubs, and any other hardware configured to function as a processor, a processing unit, or a processing device. System 102 may use one or more processors to perform operations in accordance with one or more aspects of the present disclosure using software, hardware, firmware, or a mixture of hardware, software, and firmware residing in and/or executing at system 102.

One or more storage devices within system 102 may store information for processing during operation of system 102. In some examples, one or more storage devices are temporary memories, meaning that a primary purpose of the one or more storage devices is not long-term storage. Storage devices on system 102 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices, in some examples, also include one or more computer-readable storage media. Storage devices may be configured to store larger amounts of information than volatile memory. Storage devices may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices may store program instructions and/or data associated with one or more of the modules described in accordance with one or more aspects of this disclosure.

The one or more processors and one or more storage devices may provide an operating environment or platform for one or more modules, which may be implemented as software, but may in some examples include any combination of hardware, firmware, and software. The one or more processors may execute instructions and the one or more storage devices may store instructions and/or data of one or more modules. The combination of processors and storage devices may retrieve, store, and/or execute the instructions and/or data of one or more applications, modules, or software. The processors and/or storage devices may also be operably coupled to one or more other software and/or hardware components, including, but not limited to, one or more of the components illustrated in FIG. 2.

In accordance with the techniques of the disclosure, machine learning system 102 applies a plurality of stacked STGCNs 110 to STG 112 to identify one or more multimodal subevents within an event represented by STG 112 that has spatially-related and temporally-related features. Such multimodal subevents may be, e.g., a recognized human or animal activity from video data, predictions of financial movements from financial data, or forecasts of weather events from meteorological data.

In the example of FIG. 1, machine learning system 102 receives STG 112. STG 112 is a graph that represents a plurality of features present in a multimodal event. For example, STG 112 may include descriptors of features, functional relationships between the features, and temporal relationships between the features. STG 112 includes a plurality of nodes, a plurality of spatial edges, and a plurality of temporal edges. Each node of STG 112 has a feature descriptor that describes a feature present in the event. For example, each graph node of STG 112 may represent one or more of actions, actors, objects, scenes, etc. Each spatial edge of STG 112 may represent, e.g., spatial relationships between two or more nodes (e.g., next to, on top of, etc.) and functional relationships (e.g., attribution, role, etc.) between two nodes. Each spatial edge of STG 112 may further include importance weights for each spatial or functional relationship. Each temporal edge of STG 112 may represent, e.g., temporal and causal relationships between two or more nodes. In some examples, another machine learning system (not depicted in FIG. 1) may process activity-related data to generate STG 112. For example, a separate machine learning system (not depicted in FIG. 1) may process video data to generate STG 112 that represents, e.g., an action depicted by the video data and associated actors, objects, or other contextual cues within the video data.

Furthermore, in accordance with the techniques of the disclosure, STG 112 is modified to describe contextual information beyond the information contained by a conventional STG (e.g., skeletal joint connections over time). As one example, STG 112 may include variable-length descriptors for the feature descriptors. As another example, STG 112 may include temporal edges that span multiple time steps for the event.

Machine learning system 102 processes STG 112 to identify the one or more multimodal subevents from the event represented by STG 112. As described herein, machine learning system 102 is capable of receiving, as an input, an STG 112 that has feature descriptors of variable-length, or an STG 112 that has temporal edges that span multiple time steps for the event, or an STG 112 that has both characteristics. For example, machine learning system 102 applies a plurality of stacked STGCNs 110 to STG 112 to identify the one or more multimodal subevents. Each stacked STGCN 110 (also referred to herein as a "stacked hourglass STGCN 110") is a graph convolutional network (GCN) that includes a plurality of STGCN layers. The STGCN layers include, for example, one or more spatial layers, one or more temporal layers, one or more convolution layers, and/or one or more deconvolution layers. As described herein, the terms "filter" and "layer" of STGCN 110 may be used interchangeably. Each layer comprises a vector of weights and a bias. Each layer of STGCN 110 receives an input, applies an operation to the input, and outputs the result to the next layer of STGCN 110 for processing. Thus, STGCN 110 applies each layer to an output of a previous layer. Further, an output of each layer of STGCN 110 may "map" to an input of a subsequent layer to form the neural network relationships of STGCN 110. STGCN 110 may "learn" or train a corresponding model by making incremental adjustments to the biases and weights of each of the layers of STGCN 110. The construction and operation of each STGCN 110 is described in more detail below. While in the example of FIG. 1, machine learning system 102 includes "N" stacked STGCNs 110, other example implementations of the techniques of the disclosure may have, e.g., two or more stacked STGCNs 110. Machine learning system 102 may include one or more STGCNs 110 stacked with one another, the number depending on the use case for which machine learning system 102 is designed.

Machine learning system 102 applies the plurality of stacked STGCNs 110 to STG 112 to identify the one or more multimodal subevents. For example, given an STG 112 that represents labeled human poses within video data of human actions, machine learning system 102 applies the plurality of stacked STGCNs 110 to STG 112 to recognize human actives (e.g., pouring water, jogging) from STG 112. As another example, given an STG 112 that represents labeled weather data, machine learning system 102 applies the plurality of stacked STGCNs 110 to STG 112 to identify a weather event and/or generate a forecast for future weather. As another example, given an STG 112 that represents labeled financial data, machine learning system 102 applies the plurality of stacked STGCNs 110 to STG 112 to recognize financial movements in the financial data and/or generate a prediction for future financial movements with respect to the financial data.

In some examples, training data 104 includes a plurality of training STGs, each STG representing an event and labeled with one or more multimodal subevents present within the plurality of spatial edges and the plurality of temporal edges of STG 112. For example, training data 104 may include a plurality of training STGs that represent human skeletal movements within video data of human activities, the training STGs further labeled with one or more human actions performed by the humans within the video data. Machine learning system 102 inputs and processes training data 104 to train the plurality of stacked STGCNs 210 for application to STG 112 to identify multimodal subevents within an event represented by STG 112.

The techniques of the disclosure provide for improvements to machine learning system 102 that processes the modified STG. For example, a machine learning system as described herein may implement a plurality of stacked hourglass STGCNs (also referred to herein as "stacked STGCNs") that process the STG, each STGCN comprising a plurality of STGCN layers. As described herein, such a machine learning system implementing a plurality of stacked STGCNs is capable of receiving, as an input, an STG that has feature descriptors of variable-length, or an STG that has temporal edges that span multiple time steps for the event.

The techniques of the disclosure provide specific improvements to the computer-related field of machine learning that have numerous practical applications. For example, machine learning system 102 may use a rich set of contextual cues to perform, e.g., joint inferencing, by using information from STG 112 not available using conventional STGs. Further the techniques of the disclosure may enable machine learning system 102 to implement a flexible graph configuration that supports a wide range of descriptors with varied feature length in a fashion not possible y conventional STGCNs. Accordingly, machine learning system 102, as described herein, may be robust against large amounts of graph deformation over long data sequences (e.g., such as video sequences). Therefore, machine learning system 102 may have improved accuracy of action recognition and/or localization over conventional systems for action recognition. The techniques may further improve the robustness and generalization performance of machine learning system 102 for action segmentation over long video sequences.

Figure 2:
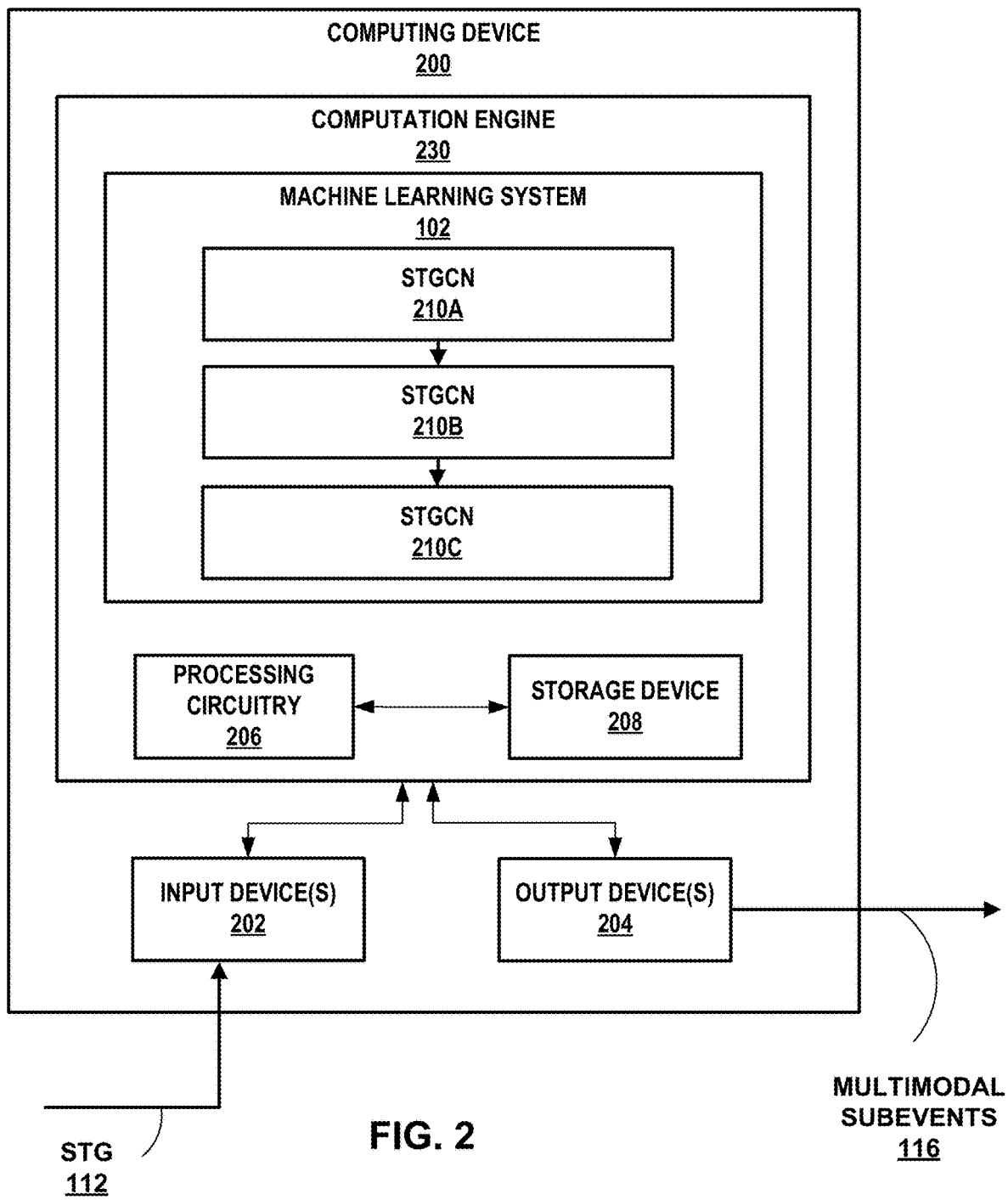
FIG. 2 is a block diagram illustrating an example computing device for identifying multimodal subevents within an event having spatially-related and temporally-related features in accordance with the techniques of the disclosure.

FIG. 2 is a block diagram illustrating an example computing device for identifying multimodal subevents within an event having spatially-related and temporally-related features in accordance with the techniques of the disclosure. In the example of FIG. 2, computing device 200 includes computation engine 230, one or more input devices 202, and one or more output devices 204.

In the example of FIG. 2, computing device 200 receives STG 112 via one or more input devices 202. Input devices 202 may include a communication device such as a network interface, keyboard, pointing device, voice responsive system, video camera, biometric detection/response system, button, sensor, mobile device, control pad, microphone, presence-sensitive screen, network, or any other type of device for detecting input from a human or machine.

Computation engine 230 may process STG 112 using machine learning system 102. Machine learning system 102 may represent software executable by processing circuitry 206 and stored on storage device 208, or a combination of hardware and software. Such processing circuitry 206 may include any one or more of a microprocessor, a controller, a digital signal processor (DSP), an application specific integrated circuit (ASIC), a field-programmable gate array (FPGA), or equivalent discrete or integrated logic circuitry. Storage device 208 may include memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. In some examples, at least a portion of computing device 200, such as processing circuitry 206 and/or storage device 208, may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

Computation engine 230 may process STG 112 using machine learning system 102 to identify one or more multimodal subevents 116 within an event represented by STG 112. In the example of FIG. 2, machine learning system 102 includes a plurality of stacked STGCNs 210A-210C (hereinafter, "stacked STGCNs 210"). Stacked STGCNs 210 may operate in a substantially similar fashion as stacked STGCNs 110 of FIG. 1. Machine learning system 102 applies the plurality of stacked STGCNs 210 to STG 112 to identify the one or more multimodal subevents 116. For example, given an STG 112 that represents labeled human poses within video data of human actions, machine learning system 102 applies the plurality of stacked STGCNs 110 to STG 112 to recognize human actives (e.g., pouring water, jogging) from STG 112. As another example, given an STG 112 that represents labeled weather data, machine learning system 102 applies the plurality of stacked STGCNs 110 to STG 112 to identify a weather event and/or generate a forecast for future weather. As another example, given an STG 112 that represents labeled financial data, machine learning system 102 applies the plurality of stacked STGCNs 110 to STG 112 to recognize financial movements in the financial data and/or generate a prediction for future financial movements with respect to the financial data.

In some examples, output device 204 is configured to output, to a user, an indication of the one or more multimodal subevents 116. Output device 204 may include a communication unit such as a network interface, display, sound card, video graphics adapter card, speaker, presence-sensitive screen, one or more USB interfaces, video and/or audio output interfaces, or any other type of device capable of generating tactile, audio, video, or other output. Output device 204 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output device 204 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output device 204 may include a presence-sensitive display that may serve as a user interface device that operates both as one or more input devices and one or more output devices.

Figure 3:
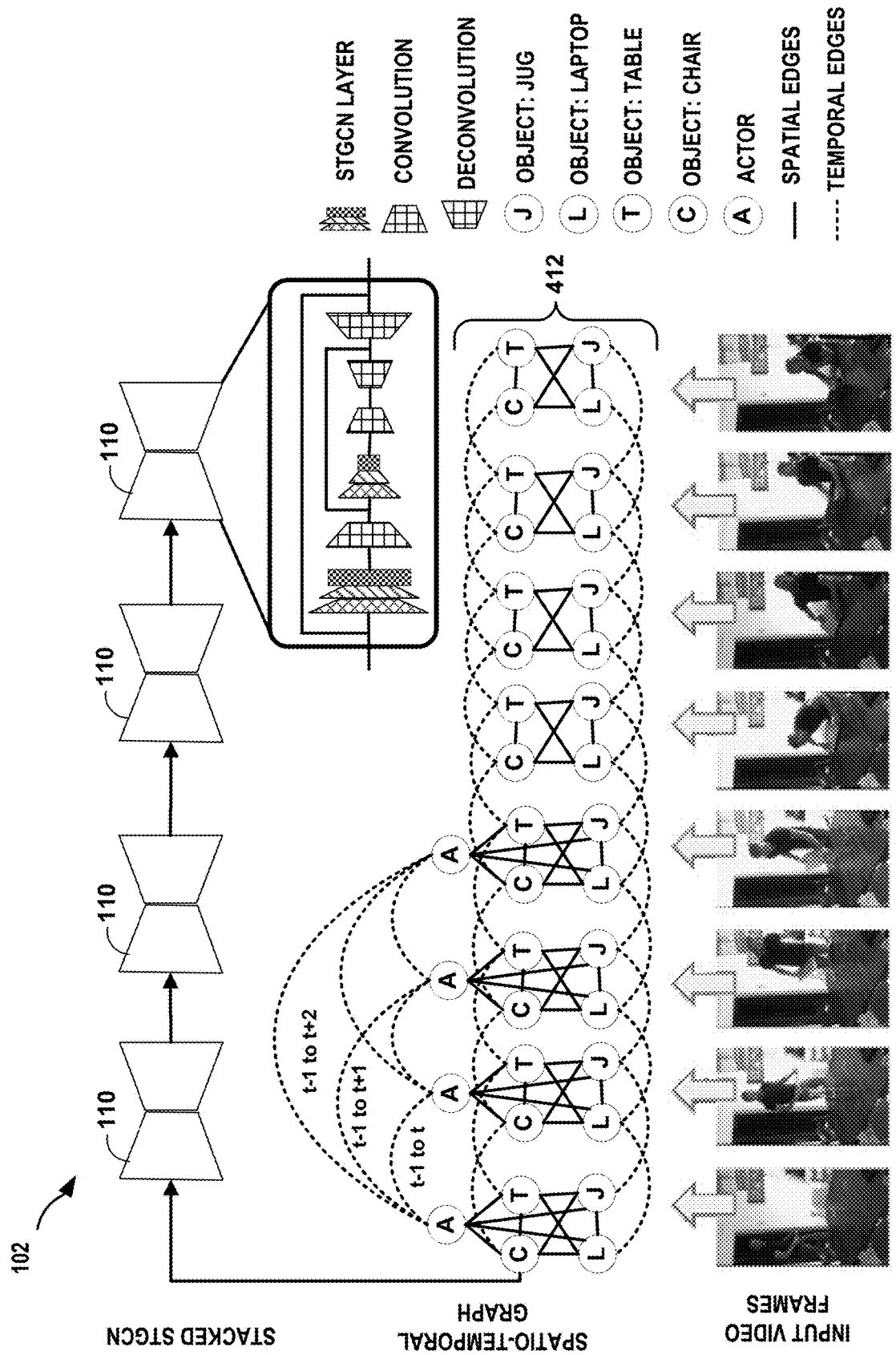
FIG. 3 is a block diagram illustrating an example implementation of the machine learning system of FIG. 1 for identifying multimodal subevents within an event having spatially-related and temporally-related features in accordance with the techniques of the disclosure.

FIG. 3 is a block diagram illustrating an example implementation of machine learning system 102 of FIG. 1 for identifying multimodal subevents within an event having spatially-related and temporally-related features in accordance with the techniques of the disclosure. Machine learning system 102 comprises a stacked hourglass architecture for STGCNs 110 that may provide improvements to generalization performance and localization accuracy. Each stacked STGCN 110 is a generalized building block that is capable of receiving a variety of nodes and/or edges of STG 412 so as to support flexible graph configuration. STG 412 may be an example of STG 112 of FIG. 1.

A conventional STG is based on a human skeleton and includes nodes that describe only skeletal joints, spatial connections that depend on physical adjacency of these joints in the human body, and temporal edges that connect joints of the same type (e.g., right wrist to right wrist) across one consecutive time steps. However, in addition to actor poses, video data of human activities frequently include other types of contextual cues that may assist action recognition. The techniques of the disclosure leverage these contextual cues to improve accuracy and robustness of action recognition and action segmentation over conventional techniques, especially for actions that involve subtle changes in a movement or pose of an actor. A graph, such as an STG, is an intuitive data structure that may jointly represent various types of contextual cues (e.g., scene graph, situation recognition, etc.).

Accordingly, the techniques of the disclosure extend a conventional STG to construct a more comprehensive STG 412 that jointly represents an action along with associated actors, objects, and/or other types of contextual cues. STG 412, as described herein, is modified from a conventional STG used for skeleton-based action recognition in several ways. First, the nodes of STG 412 have a wide range of characteristics and support using descriptors of varied length. This allows STG 412 to accommodate various types of contextual cues not supported by a conventional STG. Second, STG 412, as described herein, allows arbitrary edge connections to account for a large amount of graph deformation caused by missed detections, occlusions, emerging/disappearing objects, etc. Such arbitrary edge connections may even include, in an extreme case, a fully connected graph. Furthermore, to accommodate these improvements to STG 412, machine learning system 102 includes a modified STGCN that incorporates additional layers.

With respect to descriptors of varied length, STG 412 is extended to describe human-object interactions. For example, STG 412 may include various extracted descriptors either as channels or nodes of STG 412 that encode comprehensive contextual information about the actions. For example, STG 412 may use pose feature to describe actor nodes, appearance features including attributes at high semantic levels for object nodes, frame-level RGB, flow features for scene nodes, etc.

As an example of the above, each graph node of STG 412 is extended to represent an action, actor, object, scene, etc. Each spatial edge of STG 412 (e.g., solid line of FIG. 3) is extended to represent a spatial relationship (e.g., next to, on top of, etc.) or a functional relationship (e.g., attribution, role, etc.) between two nodes. Further, each spatial edge of STG 412 may include an importance weight for the spatial or functional relationship. Each temporal edge of STG 412 (e.g., dashed line of FIG. 3) is extended to represent a temporal or causal relationship. Thus, STG 412 may exploit a variety of descriptors to capture rich contextual cues not obtainable with conventional methods. In some examples, a conventional neural network or machine learning system may be applied raw data to perform situation recognition, object detection, scene classification, semantic segmentation, etc. The output of such a conventional network or machine learning system may provide embeddings that enable constructing the node features of STG 412. Accordingly, STG 412 allows for flexible temporal connections that may span multiple time steps. As depicted in FIG. 3, connections among actor nodes are depicted as having flexible temporal connections that span multiple time steps. Other nodes of STG 412 may such include temporal connections but are not depicted as such so as to avoid congested illustration.

One example implementation of the techniques of the disclosure may be to perform action segmentation. In this example, machine learning system 102 performs action segmentation on top of STG 412 via stacked spatio-temporal graph convolution. For example, STG 412 is fed into a stack of hourglass STGCN blocks 110 to output a sequence of predicted actions observed in the video. As discussed in more detail below, the plurality of stacked STGCNs 110 may provide improved performance over conventional techniques for action segmentation. Furthermore, by adding spatial edge connections across nodes of STG 412 with different types, machine learning system 102 may demonstrate additional minor performance improvements. This may be due to an oversimplified edge model (e.g., using fixed weights). Due to the generalized design of the plurality of stacked STGCNs 110, machine learning system 102 may be applied to a wide range of applications that require inference over a sequence of graphs that have heterogeneous data types or varied temporal extent.

As described herein, each of stacked STGCNs 110 is a stacked hourglass STGCN. Conventional stacked-hourglass networks using CNNs have been shown to improve results for a number of tasks, such as human pose estimation, facial landmark localization, etc. Stacked-hourglass networks implement an encoder-decoder architecture that allows for repeated up-sampling and down-sampling of features and allows for combining these features at different scales, thereby improving performance over other types of machine learning systems. As descried herein, an STGCN network is extended to include such an encoder-decoder architecture.

Furthermore, in contrast to the use of CNNs, STGCN systems (and GCNs in general) employ adjacency matrices to represent irregular connections among nodes. The techniques of the disclosure address this fundamental difference by adapting an hourglass network to include additional operations to down-sample the adjacency matrices at each encoder level to ensure that the adjacency matrices match the compressed dimensions of that level.

With respect to arbitrary edge connections, a conventional STG only connects physical joints of the same type across consecutive time stamps. This reduces the STG to a fixed and grid-like connectivity. As a result, a conventional temporal GCN degrades to conventional convolution. The techniques of the disclosure enable STG 412 to allow arbitrary temporal connections. This allows machine learning system 102 to support flexible configurations and account for frequent graph deformation in complexity activities (e.g., missed detections, emerging/disappearing objects, heavy occlusions, etc.). For example, an object node present at time to can be connected to an object node of the same type at time $t_n$ with $n \geq 1$, in comparison to a conventional STGCN with n=1.

With respect to the above example for performing action segmentation, machine learning system 102 may apply STGCNs 110 to long video sequences using frame-based action graphs extracted via situation recognition. Let $A_s$ and $A_t$ denote the spatial and temporal adjacency matrices, respectively. The STGCN operation performed by STGCNs 110 is represented mathematically as follows:

$$H^{l+1} = g_t(H_s^l, A_t) = \sigma(\hat{D}_t^{-1/2} \hat{A}_t \hat{D}_t^{-1/2} H_s^l W_t^l), \text{ and}$$

$$H_s^l = g_s(H^l, A_s) = \hat{D}_s^{-1/2} \hat{A}_s \hat{D}_s^{-1/2} H^l W_s^l,$$

where $W_s^l$ and $W_t^l$ represents the spatial and temporal weight metrics of the $l^{th}$ convolution layer, respectively. In comparison, a conventional STGCN reduces to:

$$H^{l+1} = g(H^l, A_s) = \sigma(\hat{D}_s^{-1/2} \hat{A}_s \hat{D}_s^{-1/2} H^l W_s^l W_t^l),$$

due to the fixed grid-like temporal connections.

Accordingly, the techniques of the disclosure provide for numerous improvements to STGs and STGCNs. For example, the techniques of the disclosure may allow STG 412 to include joint inference information over a rich set of contextual cues. Additionally, the techniques of the disclosure may provide a flexible graph configuration that supports a wide range of descriptors having varied feature length. Further the graph configuration disclosed herein may be robust to large amounts of graph deformation over, e.g., long video sequences. The techniques of the disclosure implement a stacked hourglass architecture specifically designed for GCNs that includes a plurality of STGCNs 110. Thus, the techniques of the disclosure may improve recognition and/or localization accuracy, robustness, and generalization performance for, e.g., action segmentation over long video sequences.

Figure 4:
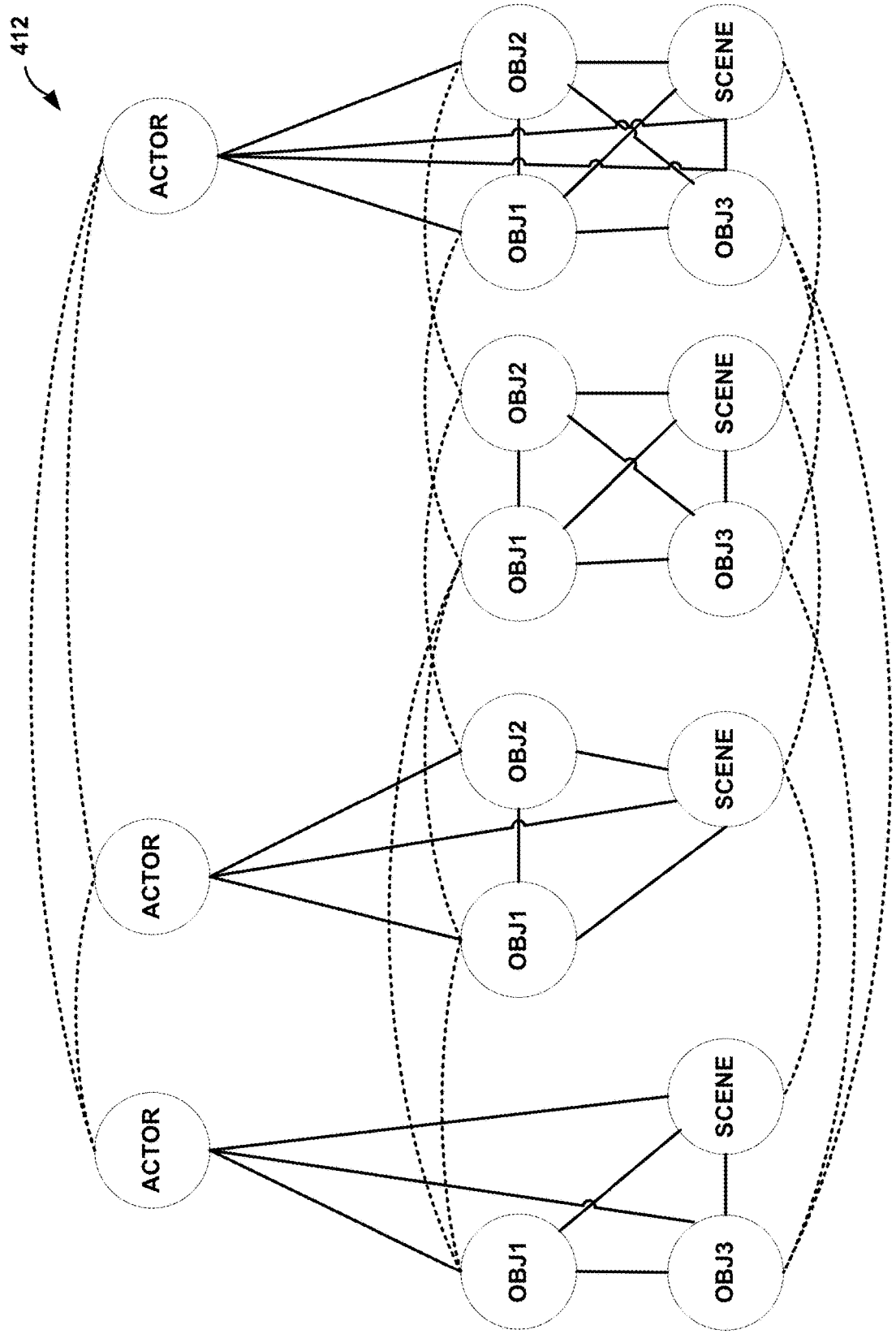
FIG. 4 is a block diagram illustrating an example spatio-temporal graph (STG) in accordance with the techniques of the disclosure.

FIG. 4 is a block diagram illustrating example STG 412 in accordance with the techniques of the disclosure. STG 412 may be an example of STG 112 of FIG. 1.

Generally speaking, a graph, such as STG 412, is defined as G (V, E), with vertices V and edges E. Vertex features of length $d^0$ are denoted as $f_i$ for $i \in \{1, 2, \ldots, N\}$, where N is the total number of nodes. Edge weights are given as $e_{i,j}$, where $e_{i,j} \geq 0$ and $i,j \in \{1, 2, \ldots, N\}$. The graph operation at the $l^{th}$ layer is defined as:

$$H^{l+1} = g(H^l, A) = \sigma(\hat{D}^{-1/2} \hat{A} \hat{D}^{-1/2} H^l W^l),$$

where $W^l$ and $H^l$ are the $d^l \times d^{l+1}$ weight matrix and $N \times d^l$ input matrix of the $l^{th}$ layer, respectively. $\hat{A} = I + A$, where $A = [e_{i,j}]$, $\hat{D}$ is the diagonal node degree matrix of $\hat{A}$ and represents a non-linear activation function (e.g., ReLU).

Figure 5:
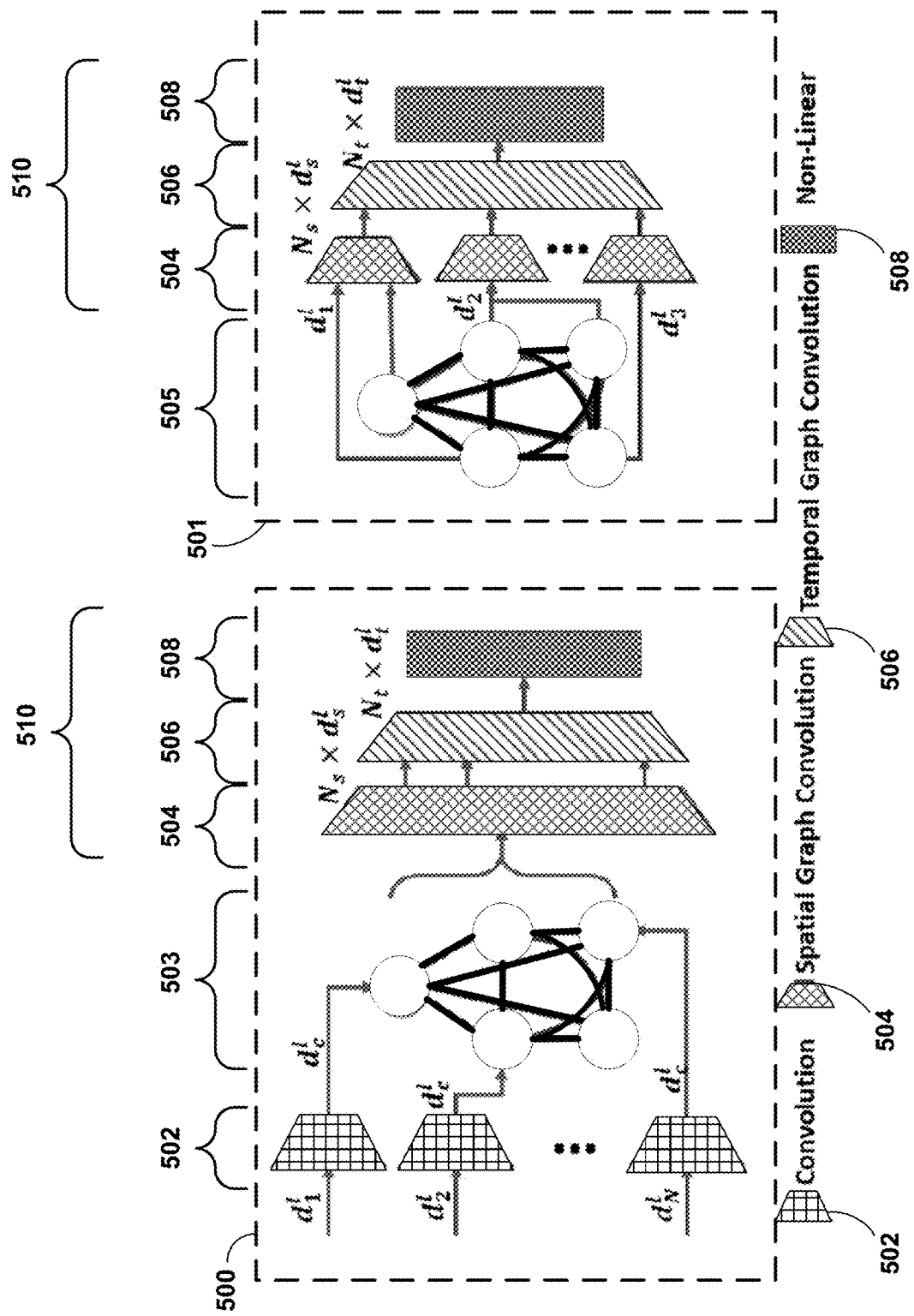
FIG. 5 is a block diagram illustrating example implementations of STGCNs that support graph nodes with varied feature length in accordance with the techniques of the disclosure.

With respect to FIG. 5, each node $v_i$ is represented by a feature vector denoted by $f_i$. An edge between node i and j has a weight $e_{i,j}$. These edge weights form the spatial and temporal adjacency matrices of STG 412. STG 412 supports a large amount of deformation, such as missed detection (e.g., between the actor node and the Obj3 node), emerging/disappearing nodes (e.g., the Obj2 node), etc.

STG 412 includes descriptors of features, functional relationships between the features, and temporal relationships between the features. For example, STG 412 includes a plurality of nodes, a plurality of spatial edges, and a plurality of temporal edges. Each node of STG 412 has a feature descriptor that describes a feature present in the event. For example, each graph node of STG 412 may represent one or more of actions, actors, objects, scenes, etc. Each spatial edge (e.g., solid line of FIG. 5) of STG 412 may represent, e.g., spatial relationships between two or more nodes (e.g., next to, on top of, etc.) and functional relationships (e.g., attribution, role, etc.) between two nodes. Each spatial edge of STG 412 may further include importance weights for each spatial or functional relationship. Each temporal edge of STG 412 (e.g., dashed line of FIG. 5) may represent, e.g., temporal and causal relationships between two or more nodes.

FIG. 5 is a block diagram illustrating example implementations 500, 501 of STGCNs that support graph nodes with varied feature length in accordance with the techniques of the disclosure. Each of STGCNs 500, 501 includes one or more of convolution layers 502, spatial graph convolution layers 504, temporal graph convolution layers 506, or non-linear layers 508. A series of spatial graph convolution layers 504, temporal graph convolution layers 506, or non-linear layers 508 forms an STGCN layer 510. Each of STGCNs 500, 501 may be configured to receive, as an input, STG 112 of FIG. 1.

A conventional STGCN requires fixed feature length across all graph nodes. In contrast, STG 112, as described herein, may include feature descriptors of varied length where nodes of different types may require different feature vectors to characterize. For example, a feature extracted from Situation Recognition may have a different length than an appearance feature extracted from Faster-RCNN.

The techniques of the disclosure provide for numerous different implementations to allow for machine learning system 102 of FIG. 1 to receive STGs 112 comprising feature descriptors of varied length. For example, STGCN 500 includes an additional convolutional layer 502 that converts feature descriptors of varied length to feature descriptors 503 of a fixed length. This solution may be simple to implement, but may not account for the situation where nodes of different types may require different length to embed different amounts of information. Converting features to a fixed length may decrease the amount of information that feature descriptors 503 may carry.

As another example, machine learning system 102 may group nodes of STG 112 into clusters based on feature length and design multiple spatial GCNs 501, each spatial GCN 501 corresponding to a node cluster of a particular length. For example, spatial GCN 501 converts features of cluster 605 to a fixed length. To allow spatial connections across these node clusters, machine learning system 102 may model these connections in a temporal adjacency matrix to avoid the use of an additional spatial GCN. This is feasible because the temporal GCN allows for arbitrary connections.

A conventional structural recurrent neural network (S-RNN) performs action recognition by using a node RNN and an edge RNN to iteratively process graph-like input. In contrast, machine learning system 102 of the present disclosure implements a single graph network that can jointly process node features and edge connectivity in an interconnected manner. This allows machine learning system 102 to provide improved performance and robustness over conventional techniques, such as the use of RNNs.

Figure 6:
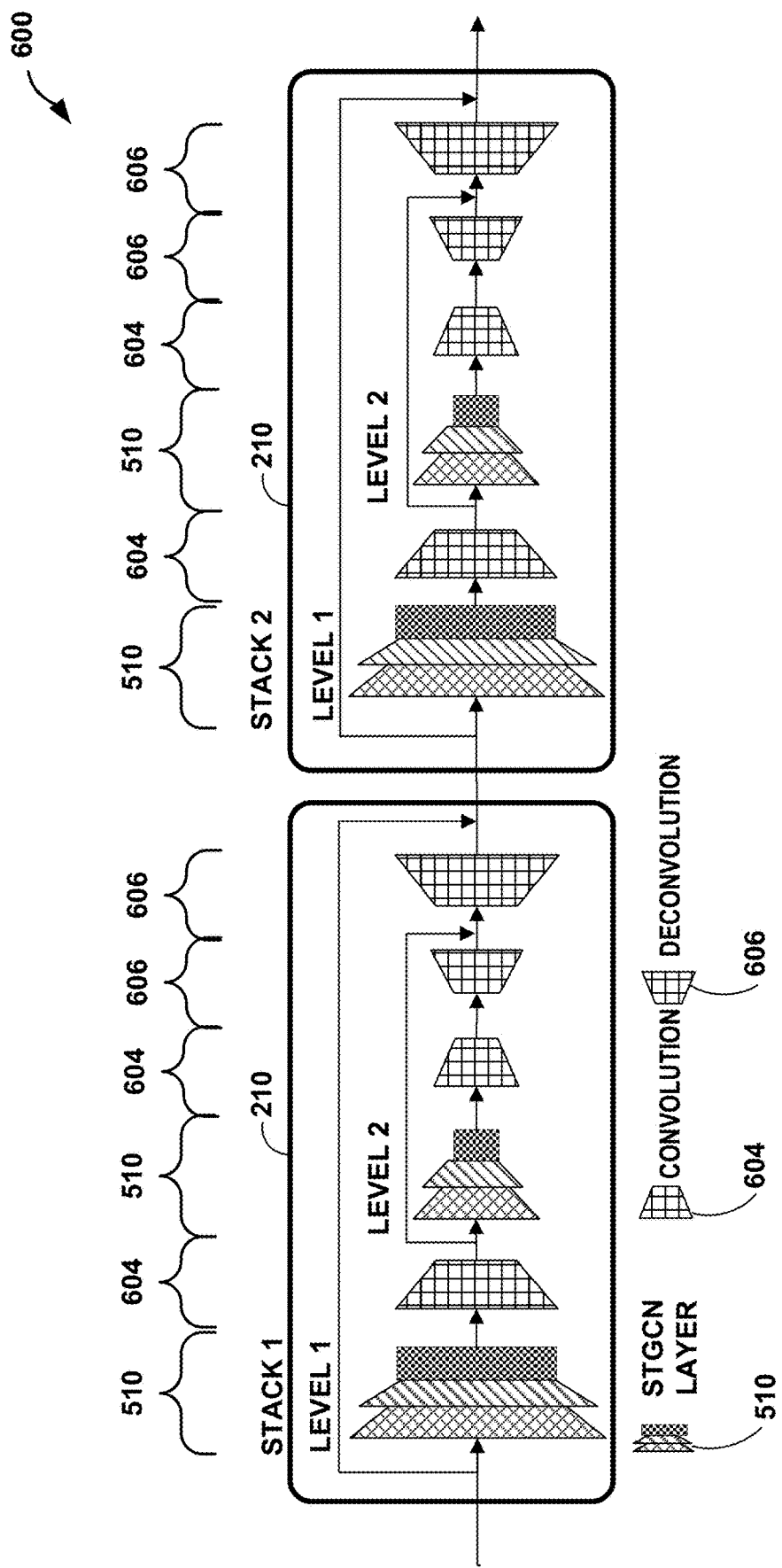
FIG. 6 is a block diagram illustrating an example implementation of stacked STGCNs in accordance with the techniques of the disclosure

FIG. 6 is a block diagram illustrating an example implementation 600 of stacked STGCNs in accordance with the techniques of the disclosure. The example architecture 600 depicted in FIG. 6 depicts two levels of stacked hourglass STGCNs. However, the techniques of the disclosure may include different numbers of stacked hourglass STGCNs. The number of STGCNs used may depend on the particular implementation.

A conventional hourglass network includes a series of down-sampling and up-sampling operations with skip connections. These conventional networks follow the principles of the information bottleneck approach to deep learning models for improved performance. These conventional networks have also been shown to work well for tasks such as human pose estimation, facial landmark localization, etc. In accordance with the techniques of the disclosure, STGCNs 210 are designed to include an hourglass architecture that leverages an encoder-decoder structure for multi-modal action identification and segmentation with improved accuracy. Particularly, architecture 600 hourglass includes a series of STGCN blocks 210. Each STGCN block 210 includes an STGCN layer 510 (e.g., one or more spatial graph convolution layers, one or more temporal graph layers, and one or more non-linear layers) followed by a strided convolution layer 604 form the basic building block for an encoding process. One or more deconvolution layers 606 form the basic building block for the decoding process that brings the spatial and temporal dimensions to an original size.

Note that, at each layer 510, 604, and 606 of each STGCN 210, a dimension of spatial matrix $A_s$ and temporal adjacency matrix $A_t$ is adjusted to reflect the down-sampling operation. For example, assuming that adjacency matrices $A_t$ and $A_s$ are of size $N_t \times N_t$ and $N_s \times N_s$, respectively, at level 1 and that a stride of two is used. At level 2, both $A_t$ and $A_s$ are sub-sampled by two and their dimensions become $N_t/2 \times N_t/2$ and $N_s/2 \times N_s/2$, respectively. Due to the information compression enabled by the encoder-decoder structure, using hourglass networks leads to performance gains as compared to using the same number of STGCN layers 510 one after another.

Figure 7:
FIG. 7 is an illustration depicting example outputs of multimodal subevents within an event identified in accordance with the techniques of the disclosure.

FIG. 7 is an illustration depicting example outputs 702, 704, 706 of multimodal subevents within an event identified in accordance with the techniques of the disclosure. The advantages of the techniques of the disclosure may be demonstrated with two example datasets, the CAD120 dataset and the Charades dataset (discussed below). FIG. 7 is described with respect to system 100 of FIG. 1.

FIG. 7 depicts example outputs 702, 704, 706 of machine learning system 102, e.g., action segmentation results of stacked STGCNs 110 in response to receiving, as inputs, a plurality of STGs 112 representing the CAD120 dataset. The CAD120 dataset, available from the Computer Science Department of Cornell University, is one of the more simplistic datasets available for activity recognition. The CAD120 dataset provides RGBD Data for 120 videos on 4 subjects as well as skeletal data. In the example of FIG. 7, machine learning system 102 uses 10 action classes as model labels. The action classes include reaching, moving, pouring, eating, drinking, opening, placing, closing, scrubbing, and null.

The CAD 120 dataset includes: object features; actor features; object-object features; object-human features; object temporal features; and human temporal features. The object features include: a centroid location; a 2D bounding box; a transformation matrix of SIFT matches between adjacent frames; a distance moved by the centroid; or a displacement of centroid. The actor features include: a location of each joint (for 8 joints); a distance moved by each joint (for 8 joints); a displacement of each joint (for 8 joints); body pose features, hand position or features. The object-object features are computed at start frame, middle frame, end frame, maximum, and minimum and include: a different in centroid locations (x,y,z) or a distance between centroids. The object-human features are computed at start frame, middle frame, end frame, maximum, and minimum and include a distance between each joint location and object centroid. The object temporal features include: a total and normalized vertical displacement; or a total and normalized distance between centroids. The human temporal features include a total and normalized distance between each corresponding joint locations (for 8 joints).

The CAD120 dataset splits each video into segments of the above mentioned actions. For each segment, the CAD120 dataset provides features for object nodes, skeleton features for actor nodes, and spatial weights for object-object and skeleton-object edges. Across segments, the CAD120 dataset also provides temporal weights for object-object and actor-actor edges. The object node feature captures information about the object's locations in the scene and the way it changes.

In one example, a data set is obtained that includes generated skeleton features for actor nodes. The spatial edge weights are based on the relative geometric features among the objects or between an object and the actor. The temporal edge weights capture the changes from one temporal segment to another. In some examples, four fold cross-validation may be carried out. For example, videos from 1 of the 4 people of the CAD120 dataset are used for testing and videos from the other 3 of the 4 people of the CAD120 dataset are used to train STGCNs 110.

Machine learning system 102 exploits all the node features and edge weights provided by the CAD120 dataset. The skeleton feature of an actor node is of length 630 and the feature of an object node is of length 180. Machine learning system 102 passes each of the descriptors through convolution layers (e.g., such as described with respect to FIG. 5) to convert the descriptors to a fixed length of 412. The initial learning rate of machine learning system 102 is 0.0004 and the learning rate scheduler has a drop rate of 0.9 with a step size of 1.

For the CAD120 dataset, the node features and edge weights are provided by the dataset itself. For comparison, the techniques of the disclosure were evaluated against conventional machine learning systems (e.g., an S-RNN and a spatio-temporal conditional random field (CRF)) that used the same set of features. An S-RNN trains two separate RNN models, one for nodes (e.g., nodeRNN) and the other for edges (e.g., edgeRNN). The edgeRNN is a single layer LSTM of size 128 and the nodeRNN uses a long short-term memory (LSTM) of size 256. The actor nodeRNN outputs an action label at each time step.

The F1 score is used as the evaluation metric to compare machine learning system 102 to the conventional machine learning systems. The spatio-temporal CRF achieved an F1 score of 80.4%, an S-RNN without edgeRNN achieved an F1 score of 82.2%, an S-RNN achieved an F1 score of 83.2%, an S-RNN with multitasking achieved an F1 score of 82.4%, and machine learning system 102 applying stacked STGCNs 110 achieved an F1 score of 87.21. Thus, machine learning system 102 of the present disclosure improves the F1 score over the best reported result of conventional techniques by approximately 4.0%. Instead of using two independent RNNs to model interactions among edges and nodes, stacked STGCNs 110 collectively perform joint inference over these inherently interconnected features. This, therefore, leads to a performance improvement over conventional techniques.

With respect to FIG. 7, machine learning system 102 performs action recognition of the CAD 120 dataset. The prediction by machine learning system 102 is compared against the GT label, which labels in solid boxes depicting a correct prediction by machine learning system 102 and labels in dashed boxes depicting an incorrect prediction by machine learning system 102. Machine learning system 102 performs action recognition accurately for example output 702. However, there are several errors in example outputs 704 and 706. For example, the third prediction of example output 704 is 'opening' instead of 'moving.' The previous action is 'reaching,' which generally precedes an 'opening' action when the actor is standing in front of a microwave and looking at it, which may cause the observed erroneous detection. Further, the ninth prediction of example output 704 is classified as 'reaching' instead of 'moving.' The ninth frame and the eleventh frame are identical except for a blue cloth in the actor's hand. Machine learning system 102 failed to capture such subtle changes, and therefore predicted the wrong action label.

The Charades dataset, available from the Allen Institute for Artificial Intelligence, is a recent real-world activity recognition/segmentation dataset including 9848 videos with 157 action classes, 38 object classes, and 33 verb classes. It contains both RGB and flow streams at a frame rate of 24 frames per second (FPS). It poses a multi-label, multi-class problem in the sense that at each time step, there can be more than one action label. The Charades dataset provides ground-truth object and verb labels as well as FC7 features for every 4th frames obtained from a two-stream network trained on Charades. The entire Charades dataset is split into 7985 training videos and 1863 testing videos.

The Charades dataset includes scene features, actor features, and object features. The scene features include: an FC7 layer output of a VGG network trained on RGB frames; an FC7 layer output of a VGG network trained on flow frames; an I3D pre-final layer output trained on RGB frames; or an I3D pre-final layer output trained on flow frames. The actor features include an output of a GNN-based Situation Recognition trained on the ImSitu dataset, from M. Yatskar et. al, available at http://imsitu.org/. The object features include the top 5 object detection features from Faster-RCNN. VGG is described by K. Simonyan, et al., Very Deep Convolutional Networks for Large-Scale Image Recognition (Apr. 15, 2015), available at https://arxiv.org/abs/1409.1556. I3D is described by Carreira, et. al, Quo Vadis, Action Recognition? A New Model and the Kinetics Dataset (Feb. 12, 2018), available at https://arxiv.org/abs/1705.07750.

For the Charades dataset, machine learning system 102 was examined with respect to two types of features, one based on VGG and the other based on I3D, for the scene nodes in STG 112. In one example, a GNN-based situation recognition technique trained on the ImSitu dataset was used to generate, from the Charades dataset, the verb feature for the actor nodes of STG 112. The top five object features of a Faster-RCNN network trained on MSCOCO are used as descriptors of the object nodes of STG 112. In total, the spatial dimension of STG 112 is 8. The VGG features are of length 4096, the verb features of length 1024, and the object features of length 2048. Each of these channels are individually processed by stacked STGCNs 110 using convolution layers to convert them to a fixed length (e.g., 412), as described above with respect to FIG. 5.

In this experiment, spatial nodes of STG 112 are fully connected, and temporal edges of STG 112 allow connections across three time steps, e.g., at the $i^{th}$ step there are edges from t, to t+1, t+2, and t+3. The spatial edges between nodes are given a much smaller weight than self connections. In this example, machine learning system 102 implements a stack of three hourglass STGCN blocks 110. In the model, before applying a normalized adjacency matrix, the input is normalized by subtracting a mean. The output of the final stacked STGCN block 110 is spatially pooled and passes through a fully connected layer to generate the probability scores of all possible classes. Since the Charades is a multilabel, multi-class dataset, machine learning system 102 uses a binary cross-entropy loss. Machine learning system 102 is configured with an initial learning rate of 0.001, a learning rate scheduler with a step size of 10, a drop rate of 0.999.

In some examples, system 100 may use a trained I3D model to generate descriptors for the scene nodes replacing the VGG features to further improve action segmentation performance on Charades. These feature descriptors are of length 1024. Because I3D already represents short-term temporal dependencies, one stacked hourglass STGCN block 110 may be sufficient for capturing long-term temporal dependencies. In this example, the initial learning rate of machine learning system 102 was 0.0005 and a learning rate scheduler for machine learning system 102 is fixed at a drop rate of 0.005 at a step size of 10.

In one example, during training of STGCNs 110, a maximum temporal dimension is selected to be 50. If a length of a video segment is less than 50, the rest of the positions are zero-padded. These zero-padded positions are not used for loss or score computation. If a length of a video segment is greater than 50, a starting point is randomly selected, and the next 50 consecutive frames are used as an input to STG 112.

For testing in this example, machine learning system 102 used a sliding window of length 50. Based on overlapping ratios, a weighted average over these windowed scores was applied to produce the final score. An overlap of 40 time steps was used. Following instructions in the Charades dataset, 25 equally spaced points were selected from available time steps in the video to generate the final score vectors.

The performance, based on mAP, of machine learning system 102 on the Charades dataset was compared to conventional systems for action segmentation, including a baseline, which uses two-stream VGG or I3D features directly for per frame action label prediction, an LSTM-based method, and the Super-Events approach described by A. Piergiovanni et al., Learning latent superevents to detect multiple activities in videos, In Proceedings of the IEEE Conference on Computer Vision and Pattern Recognition (CVPR), volume 4, 2018. The mAP was compared for both frame-based VGG features and segment-based I3D features. Scripts provided by the Charades dataset were used to generate the mAP scores. For VGG, the baseline mAP was 6.56, the LSTM mAP was 7.85, the super-events mAP was 8.53, while stacked STGCNs 110 achieved a mAP of 10.94. For I3D, the baseline mAP was 17.22, the LSTM mAP was 18.12, the super-events mAP was 19.41, while stacked STGCNs 110 achieved a mAP of 19.09.

Using VGG features, stacked STGCNs 110 yield an approximate 2.4% improvement in mAP. Further, for VGG, stacked STGCNs 110 improve the best reported result without post-processing by 1.3%. Using I3D features, stacked STGCNs 110 outperform other conventional methods except for the Super-Events approach, which employs an attention mechanism to learn proper temporal span per class. In some examples, the performance of stacked STGCNs 110 may be further increased by incorporating such an attention mechanism to learn proper temporal span per class.

Figure 8:
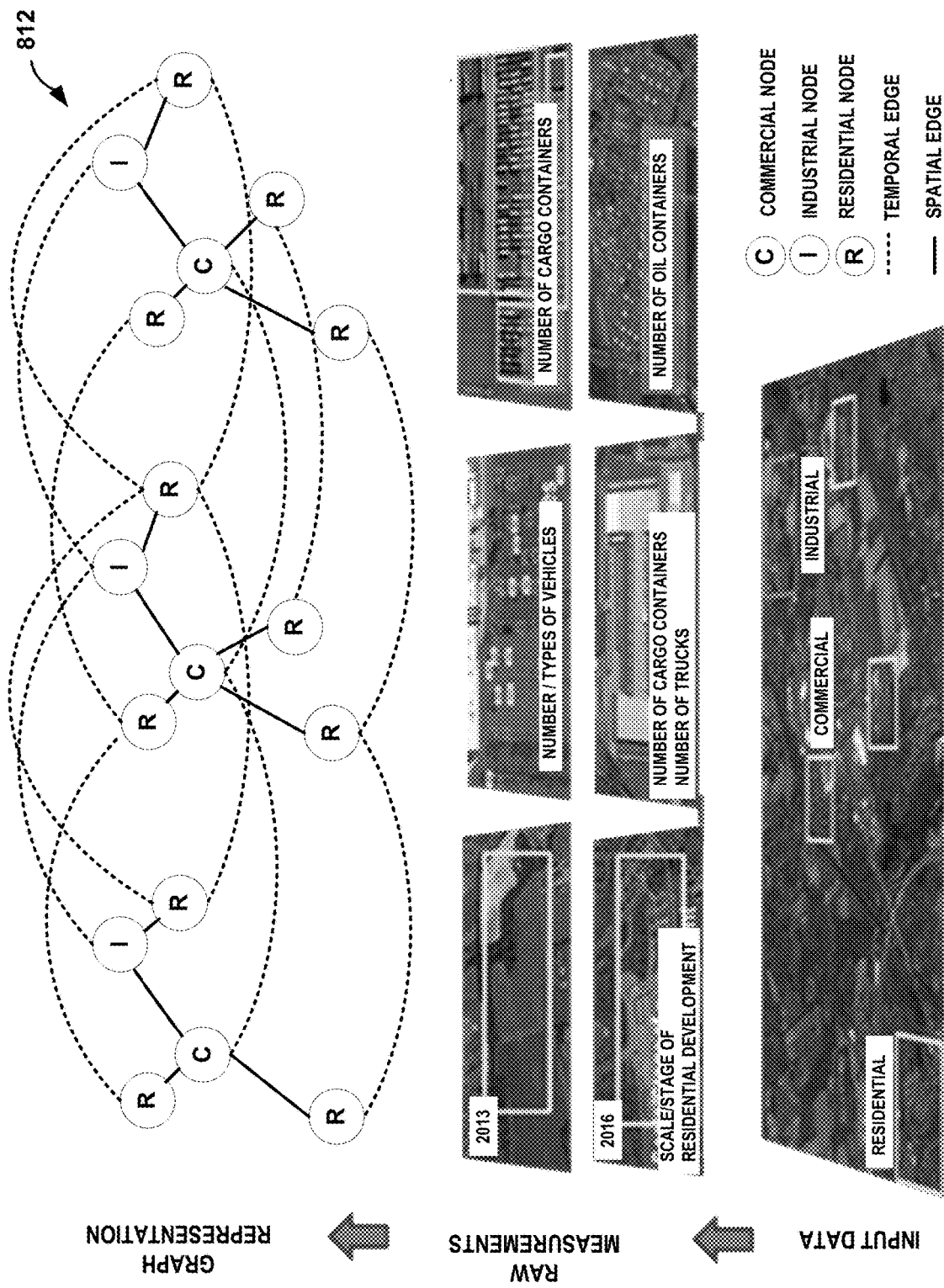
FIG. 8 is a block diagram illustrating an example implementation of the machine learning system of FIG. 1 for identifying multimodal subevents within an event having spatially-related and temporally-related features in accordance with the techniques of the disclosure.

FIG. 8 is a block diagram illustrating an example implementation of machine learning system 102 of FIG. 1 for identifying multimodal subevents within an event having spatially-related and temporally-related features in accordance with the techniques of the disclosure. Specifically, machine learning system 102 applies the plurality of stacked STGCNs 110 to STG 812 to recognize financial movements in financial data and/or generate a prediction for future financial movements with respect to the financial data. STG 812 may be an example of STG 112 of FIG. 1.

The plurality of stacked STGCNs 110 described herein are generic and applicable to a verity of problems including financial analysis that requires the examination of both spatial correlation and temporal dependency. For example, analysts may be interested in economic growth in a region of interest. The analysts obtain archived satellite imagery 802 of the region of interest. From satellite image processing, raw measurements such as number of vehicles, number of cargo containers, construction activities, etc. are extracted from local patches of the region of interest. These raw measurements are organized into a graph representation (e.g., STG 812) with nodes representing patches, raw measurements as their attributes, and spatial proximity and temporal dependency as edges. Machine learning system 102 directly applies the plurality of stacked STGCNs 110 to STG 812 for the analysis of both regional economic growth and localized trend of a particular patch. In this way, machine learning system 102 may identify financial movements from satellite imagery 802 and/or generate a prediction for future financial movements in the region of interest with respect to satellite imagery 802.

Figure 9:
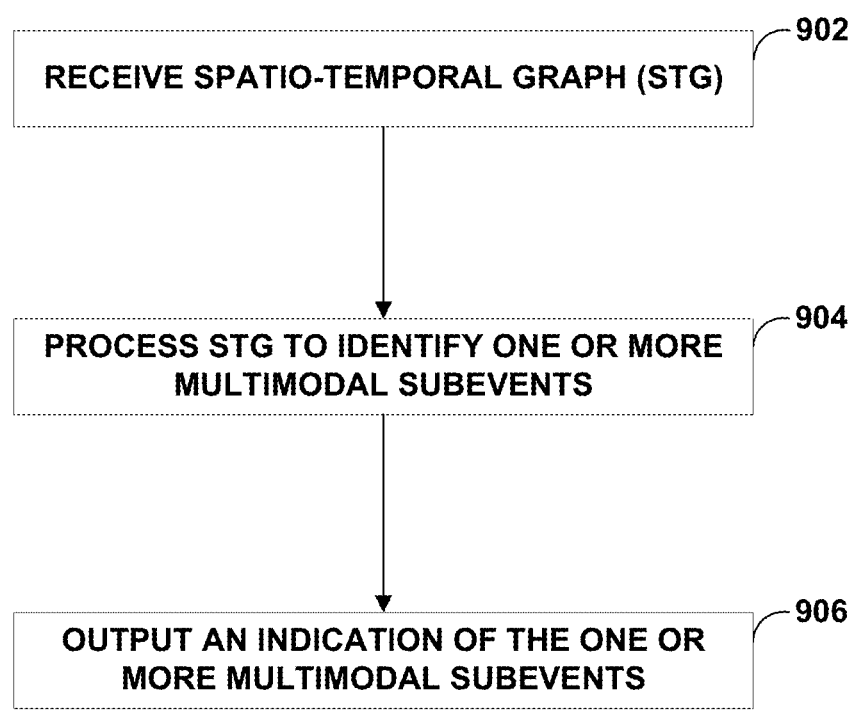
FIG. 9 is a flow chart illustrating an example operation in accordance with the techniques of the disclosure.

FIG. 9 is a flowchart illustrating an example mode of operation in accordance with the techniques of the disclosure. FIG. 9 is described with respect to FIG. 1.

In the example of FIG. 1, machine learning system 102 receives STG 112 (902). STG is a graph that represents a plurality of features present in a multimodal event. For example, STG 112 may include descriptors of features, functional relationships between the features, and temporal relationships between the features. STG 112 includes a plurality of nodes, a plurality of spatial edges, and a plurality of temporal edges. Each node of STG 112 has a feature descriptor that describes a feature present in the event. For example, each graph node of STG 112 may represent one or more of actions, actors, objects, scenes, etc. Each spatial edge of STG 112 may represent, e.g., spatial relationships between two or more nodes (e.g., next to, on top of, etc.) and functional relationships (e.g., attribution, role, etc.) between two nodes. Each spatial edge of STG 112 may further include importance weights for each spatial or functional relationship. Each temporal edge of STG 112 may represent, e.g., temporal and causal relationships between two or more nodes. Furthermore, STG 112 is modified to describe contextual information beyond the information contained by a conventional STG (e.g., skeletal joint connections over time). As one example, STG 112 includes variable-length descriptors for the feature descriptors. As another example, STG 112 includes temporal edges that span multiple time steps for the event.

Machine learning system 102 processes STG 112 to identify one or more multimodal subevents from the event represented by STG 112 (904). For example, machine learning system 102 applies a plurality of stacked STGCNs 110 to STG 112 to identify the one or more multimodal subevents. Each stacked STGCN 110 is a GCN that includes a plurality of STGCN layers. The STGCN layers include, for example, one or more spatial layers, one or more temporal layers, one or more convolution layers, and/or one or more deconvolution layers. Machine learning system 102 may include one or more STGCNs 110 stacked with one another, the number depending on the use case for which machine learning system 102 is designed.

For example, given an STG 112 that represents labeled human poses within video data of human actions, machine learning system 102 applies the plurality of stacked STGCNs 110 to STG 112 to recognize human actives (e.g., pouring water, jogging) from STG 112. As another example, given an STG 112 that represents labeled weather data, machine learning system 102 applies the plurality of stacked STGCNs 110 to STG 112 to identify a weather event and/or generate a forecast for future weather. As another example, given an STG 112 that represents labeled financial data, machine learning system 102 applies the plurality of stacked STGCNs 110 to STG 112 to recognize financial movements in the financial data and/or generate a prediction for future financial movements with respect to the financial data. Machine learning system outputs, to a user, an indication of the one or more multimodal subevents (906).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A system for identifying one or more multimodal subevents within an event having spatially-related and temporally-related features, the system comprising:
    an input device configured to receive a Spatio-Temporal Graph (STG) comprising (1) a plurality of nodes, each node of the plurality of nodes having a feature descriptor that describes a feature present in the event, (2) a plurality of spatial edges, each spatial edge of the plurality of spatial edges describing a spatial relationship between two of the plurality of nodes, and (3) a plurality of temporal edges, each temporal edge of the plurality of temporal edges describing a temporal relationship between two of the plurality of nodes,
    wherein the STG comprises at least one of: (1) variable-length descriptors for the feature descriptors or (2) temporal edges that span multiple time steps for the event;
    a computation engine comprising processing circuitry for executing a machine learning system comprising one or more stacked Spatio-Temporal Graph Convolutional Networks (STGCNs), the one or more stacked STGCNs configured to process the STG to identify the one or more multimodal subevents for the event, wherein each stacked STGCN of the one or more stacked STGCNs comprises:
        a plurality of STGCN layers comprising two or more of: a spatial graph convolution layer, a temporal graph convolution layer, or a non-linear convolution layer;
        one or more convolutional layers configured to receive an output of the plurality of STGCN layers; and
        one or more deconvolutional layers configured to receive an output of the one or more convolutional layers; and
    an output device configured to output an indication of the one or more multimodal subevents.

2. The system of claim 1,
    wherein the STG comprises the variable-length feature descriptors, and
    wherein the one or more stacked STGCNs are further configured to process the STG to convert the variable-length feature descriptors to fixed-length feature descriptors.

3. The system of claim 2,
    wherein the plurality of nodes of the STG comprise a plurality of clusters of nodes, each cluster of the plurality of clusters having feature descriptors that have a length that is different from a length of feature descriptors of each other cluster of the one or more clusters,
    wherein, to process the STG to convert the variable-length feature descriptors to fixed-length feature descriptors, the one or more stacked STGCNs further comprise, for each cluster of the plurality of clusters, a spatial graph convolutional network (GCN) configured to process the cluster to convert the variable-length feature descriptors of the nodes of the cluster to the fixed-length feature descriptors.

4. The system of claim 2,
    wherein, to process the STG to convert the variable-length feature descriptors to fixed-length feature descriptors, the one or more stacked STGCNs comprise one or more second convolutional layers configured to convert the variable-length feature descriptors of the plurality of nodes to the fixed-length feature descriptors.

5. The system of claim 1,
wherein the STG comprises an adjacency matrix that represents irregular connections between the plurality of nodes, and
wherein to process the STG to identify the one or more multimodal subevents for the event:
the plurality of STGCN layers and the one or more convolutional layers of the one or more stacked STGCNs are configured to perform a plurality of down-sampling operations; and
the one or more deconvolutional layers of the one or more stacked STGCN are configured to perform a plurality of up-sampling operations on the adjacency matrix.

6. The system of claim 5, wherein each stacked STGCN of the of one or more stacked STGCNs is a graph convolutional neural network comprising a first plurality of graph convolutional layers and a second plurality of graph convolutional layers,
wherein the first plurality of graph convolutional layers comprises the plurality of STGCN layers and the one or more convolutional layers, and
wherein the second plurality of graph convolutional layers comprises the one or more deconvolutional layers.

7. The system of claim 1, wherein the plurality of stacked STGCNs are trained with a plurality of STGs, each STG of the plurality of STGs labeled with one or more multimodal subevents present within the plurality of spatial edges and the plurality of temporal edges of the STG.

8. The system of claim 1,
wherein the one or more multimodal subevents comprise one or more recognized human or animal activities,
wherein the feature descriptor of each node of the plurality of nodes describes a human event feature, the human event feature including one of at least an actor, an object, a scene, or a human action,
wherein each spatial edge of the plurality of spatial edges describes a spatial relationship between two of the human event features, and
wherein each temporal edge of the plurality of spatial edges describes a temporal relationship between two of the human event features.

9. The system of claim 1,
wherein the one or more multimodal subevents comprise one or more meteorological predictions,
wherein the feature descriptor of each node of the plurality of nodes describes a meteorological feature,
wherein each spatial edge of the plurality of spatial edges describes a spatial relationship between two of the meteorological features, and
wherein each temporal edge of the plurality of spatial edges describes a temporal relationship between two of the meteorological features.

10. The system of claim 1,
wherein the one or more multimodal subevents comprise one or more financial predictions,
wherein the feature descriptor of each node of the plurality of nodes describes a financial feature,
wherein each spatial edge of the plurality of spatial edges describes a spatial relationship between two of the financial features, and
wherein each temporal edge of the plurality of spatial edges describes a temporal relationship between two of the financial features.

11. The system of claim 1,
wherein the one or more stacked STGCNs comprise a first stacked STGCN and a second stacked STGCN, and
wherein the plurality of STGCN layers of the second stacked STGCN are configured to receive an output of the one or more deconvolutional layers of the first stacked STGCN.

12. The system of claim 1, wherein the STG comprises the temporal edges that span multiple time steps for the event.

13. The system of claim 12,
wherein a first temporal edge of the plurality of temporal edges describes a first temporal relationship between a first node of the plurality of nodes and a second node of the plurality of nodes, the first node having a first feature descriptor that describes a first feature at a first time step, the second node having a second feature descriptor that describes the first feature at a second time step subsequent to the first time step, and
wherein a second temporal edge describes a second temporal relationship between the first node and a third node of the plurality of nodes, the third node having a third feature descriptor that describes the first feature at a third time step subsequent to the second time step.

14. A method for identifying one or more multimodal subevents within an event having spatially-related and temporally-related features, the method comprising:
receiving, by a computing system comprising a machine learning system, a Spatio-Temporal Graph (STG) comprising (1) a plurality of nodes, each node of the plurality of nodes having a feature descriptor that describes a feature present in the event, (2) a plurality of spatial edges, each spatial edge of the plurality of spatial edges describing a spatial relationship between two of the plurality of nodes, and (3) a plurality of temporal edges, each temporal edge of the plurality of temporal edges describing a temporal relationship between two of the plurality of nodes,
wherein the STG comprises at least one of: (1) variable-length descriptors for the feature descriptors; or (2) temporal edges that span multiple time steps for the event;
executing, by the computing system, the machine learning system to process the STG to identify the one or more multimodal subevents for the event, wherein the machine learning system comprises one or more stacked Spatio-Temporal Graph Convolutional Networks (STGCNs) each comprising:
a plurality of STGCN layers comprising two or more of: a spatial graph convolution layer, a temporal graph convolution layer, or a non-linear convolution layer;
one or more convolutional layers configured to receive an output of the plurality of STGCN layers; and
one or more deconvolutional layers configured to receive an output of the one or more convolutional layers; and
outputting, by an output device, an indication of the one or more multimodal subevents.

15. The method of claim 14,
wherein the STG comprises the variable-length feature descriptors, and
wherein executing the machine learning system to process the STG further comprises processing the STG to convert the variable-length feature descriptors to fixed-length feature descriptors.

16. The method of claim 15,
wherein the plurality of nodes of the STG comprise a plurality of clusters of nodes, each cluster of the plurality of clusters having feature descriptors that have a length that is different from a length of feature descriptors of each other cluster of the one or more clusters,
wherein, to process the STG to convert the variable-length feature descriptors to fixed-length feature descriptors, the one or more stacked STGCNs further comprise, for each cluster of the plurality of clusters, a spatial graph convolutional network (GCN) configured to process the cluster to convert the variable-length feature descriptors of the nodes of the cluster to the fixed-length feature descriptors.

17. The method of claim 15,
wherein, processing the STG to convert the variable-length feature descriptors to fixed-length feature descriptors comprises converting, by one or more convolutional layers of the one or more stacked STGCNs, the variable-length feature descriptors of the plurality of nodes of the fixed-length feature descriptors.

18. The method of claim 14,
wherein the STG comprises an adjacency matrix that represents irregular connections between the plurality of nodes, and
wherein processing the STG to identify the one or more multimodal subevents for the event comprises:
performing, by the plurality of STGCN layers and the one or more convolutional layers of the one or more stacked STGCNs, a plurality of down-sampling operations; and
performing, by the one or more deconvolutional layers of the one or more stacked STGCN, a plurality of up-sampling operations on the adjacency matrix.

19. The method of claim 14,
wherein the one or more multimodal subevents comprise one or more recognized human or animal activities,
wherein the feature descriptor of each node of the plurality of nodes describes a human event feature, the human event feature including one of at least an actor, an object, a scene, or a human action,
wherein each spatial edge of the plurality of spatial edges describes a spatial relationship between two of the human event features, and
wherein each temporal edge of the plurality of spatial edges describes a temporal relationship between two of the human event features.

20. A non-transitory computer-readable medium comprising instructions for identifying one or more multimodal subevents within an event having spatially-related and temporally-related features, the instructions configured to cause processing circuitry of a computation engine to:
receive a Spatio-Temporal Graph (STG) comprising (1) a plurality of nodes, each node of the plurality of nodes having a feature descriptor that describes a feature present in the event, (2) a plurality of spatial edges, each spatial edge of the plurality of spatial edges describing a spatial relationship between two of the plurality of nodes, and (3) a plurality of temporal edges, each temporal edge of the plurality of temporal edges describing a temporal relationship between two of the plurality of nodes,
wherein the STG comprises at least one of: (1) variable-length descriptors for the feature descriptors; or (2) temporal edges that span multiple time steps for the event;
execute a machine learning system to process the STG to identify the one or more multimodal subevents for the event, wherein the machine learning system comprises one or more stacked Spatio-Temporal Graph Convolutional Networks (STGCNs) each comprising:
a plurality of STGCN layers comprising two or more of: a spatial graph convolution layer, a temporal graph convolution layer, or a non-linear convolution layer;
one or more convolutional layers configured to receive an output of the plurality of STGCN layers; and
one or more deconvolutional layers configured to receive an output of the one or more convolutional layers; and
output an indication of the one or more multimodal subevents.

* * * * *